US010946696B2

(12) United States Patent
Levinson et al.

(10) Patent No.: US 10,946,696 B2
(45) Date of Patent: Mar. 16, 2021

(54) AXLE ASSEMBLY INCLUDING A WHEEL END AND METHOD OF MANUFACTURE

(71) Applicant: ArvinMeritor Technology, LLC, Troy, MI (US)

(72) Inventors: James Levinson, Asheville, NC (US); Dale Kwasniewski, Galesburg, MI (US); Randy Holland, Fletcher, NC (US); James Gant, Fletcher, NC (US); Timothy Mann, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 16/028,658

(22) Filed: Jul. 6, 2018

(65) Prior Publication Data

US 2020/0009911 A1 Jan. 9, 2020

(51) Int. Cl.
*B60B 35/16* (2006.01)
*B21D 53/90* (2006.01)
*B21K 1/26* (2006.01)
*B23K 20/12* (2006.01)

(52) U.S. Cl.
CPC ............ *B60B 35/163* (2013.01); *B21D 53/90* (2013.01); *B21K 1/26* (2013.01); *B23K 20/129* (2013.01); *B60B 2310/208* (2013.01); *B60B 2310/3025* (2013.01); *B60G 2206/50* (2013.01)

(58) Field of Classification Search
CPC .... B21D 53/90; B23K 20/129; B60B 35/163; B60B 35/16; B60G 2206/50
See application file for complete search history.

(56) References Cited

U.S. PATENT DOCUMENTS

| 1,594,434 A | * | 8/1926 | Trumble | B60B 35/163 |
| | | | | 74/607 |
| 1,621,007 A | * | 3/1927 | Ford | B21D 53/90 |
| | | | | 228/151 |
| 1,689,989 A | * | 10/1928 | Williams | B60B 35/16 |
| | | | | 29/463 |
| 1,955,824 A | * | 4/1934 | Mogford | B60B 35/004 |
| | | | | 74/607 |
| 2,131,237 A | * | 9/1938 | Spatta | B21D 53/90 |
| | | | | 74/607 |
| 2,178,350 A | * | 10/1939 | Spatta | B21D 53/90 |
| | | | | 72/340 |

(Continued)

FOREIGN PATENT DOCUMENTS

GB 565992 A 12/1944
WO 2008/150705 A1 12/2008

OTHER PUBLICATIONS

Australian Examination Report dated Mar. 19, 2020 for related Australian Application No. 2019204547; 5 pages.

(Continued)

*Primary Examiner* — Jacob J Cigna
*Assistant Examiner* — Michael W Hotchkiss
(74) *Attorney, Agent, or Firm* — Brooks Kushman PC

(57) ABSTRACT

An axle housing assembly includes an axle housing that includes a center portion and a first arm portion that extends from the center portion. The axle housing assembly further includes a wheel end housing that includes a wheel end body that extends from the first arm portion and a spindle that extends from the wheel end body.

19 Claims, 5 Drawing Sheets

(56) References Cited

U.S. PATENT DOCUMENTS

| | | | | |
|---|---|---|---|---|
| 2,204,287 | A * | 6/1940 | Wilber | B60B 35/16 74/607 |
| 2,256,065 | A * | 9/1941 | Urschel | B21K 1/10 295/36.1 |
| 2,370,641 | A * | 3/1945 | Dewey | B21D 53/90 228/151 |
| 2,480,833 | A * | 9/1949 | Buckendale | B60B 35/16 74/607 |
| 2,569,452 | A * | 10/1951 | Buckendale | B60B 35/166 74/607 |
| 2,752,673 | A * | 7/1956 | Williams | B21K 1/26 29/463 |
| 3,041,890 | A * | 7/1962 | O'Brien | B60B 35/18 74/607 |
| 3,269,214 | A * | 8/1966 | Nagel | B60B 35/16 74/607 |
| 3,535,002 | A * | 10/1970 | Stamm | B60B 35/16 301/124.1 |
| 3,715,935 | A * | 2/1973 | Ebey | F16H 57/023 74/607 |
| 3,858,429 | A * | 1/1975 | Winkler | B21K 1/26 72/405.07 |
| 4,234,120 | A * | 11/1980 | Pringle | B60B 35/163 228/173.6 |
| 4,455,732 | A * | 6/1984 | Shiets | B22D 19/10 29/402.06 |
| 4,768,839 | A * | 9/1988 | Spindler | B23K 20/129 301/124.1 |
| 4,841,802 | A | 6/1989 | Peck | |
| 5,303,985 | A * | 4/1994 | Barnholt | B60B 35/006 301/124.1 |
| 6,024,418 | A * | 2/2000 | Ebert | B23K 31/02 301/130 |
| 6,032,967 | A * | 3/2000 | Ogoniek | B60B 35/08 280/124.1 |
| 6,257,090 | B1 * | 7/2001 | Arakawa | B60B 35/163 74/607 |
| 6,257,606 | B1 * | 7/2001 | Hynes | B60G 11/113 267/40 |
| 6,412,879 | B1 * | 7/2002 | Ogoniek | B60B 35/006 301/125 |
| 6,609,649 | B1 | 8/2003 | Barnholt et al. | |
| 6,701,763 | B2 * | 3/2004 | Varela | B21D 26/033 29/421.1 |
| 7,140,530 | B2 * | 11/2006 | Durand | B60B 35/16 228/234.1 |
| 8,109,000 | B2 * | 2/2012 | Zalanca | B60B 35/16 29/897.2 |
| 8,776,374 | B2 * | 7/2014 | Johnston | B23P 15/00 29/897.2 |
| 9,109,689 | B2 * | 8/2015 | Khatavkar | F16H 57/037 |
| 9,156,312 | B1 * | 10/2015 | Ruggeri | B60B 35/16 |
| 9,267,596 | B2 * | 2/2016 | Trost | F16H 57/045 |
| 9,290,072 | B2 * | 3/2016 | Berner | B60B 35/007 |
| 9,358,836 | B2 * | 6/2016 | David | B60B 35/1054 |
| 10,308,070 | B1 * | 6/2019 | Carroll | B60B 35/14 |
| 2004/0112942 | A1 * | 6/2004 | Durand | B60B 35/16 228/115 |
| 2013/0333959 | A1 * | 12/2013 | Wagemann | B60K 7/0007 180/62 |
| 2014/0251081 | A1 * | 9/2014 | Huang | B60B 35/163 74/607 |
| 2015/0354691 | A1 * | 12/2015 | Keeney | F16H 57/037 74/607 |
| 2018/0354302 | A1 * | 12/2018 | Gratzl | B60B 35/166 |

OTHER PUBLICATIONS

Extended European Search Report dated Jan. 7, 2020 for related European Application No. 19183623.8 12 pages.
India First Examination Report dated Jan. 29, 2021 for related India Application No. 201914026432; 6 pages.

\* cited by examiner

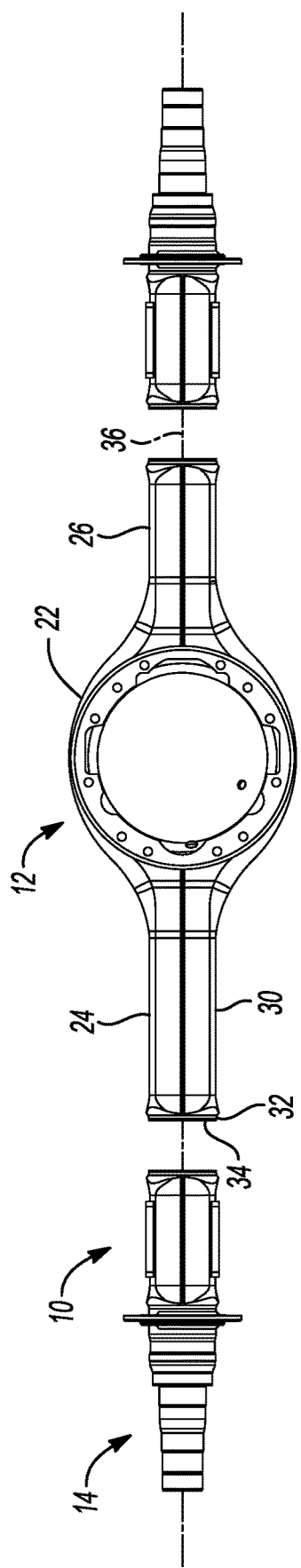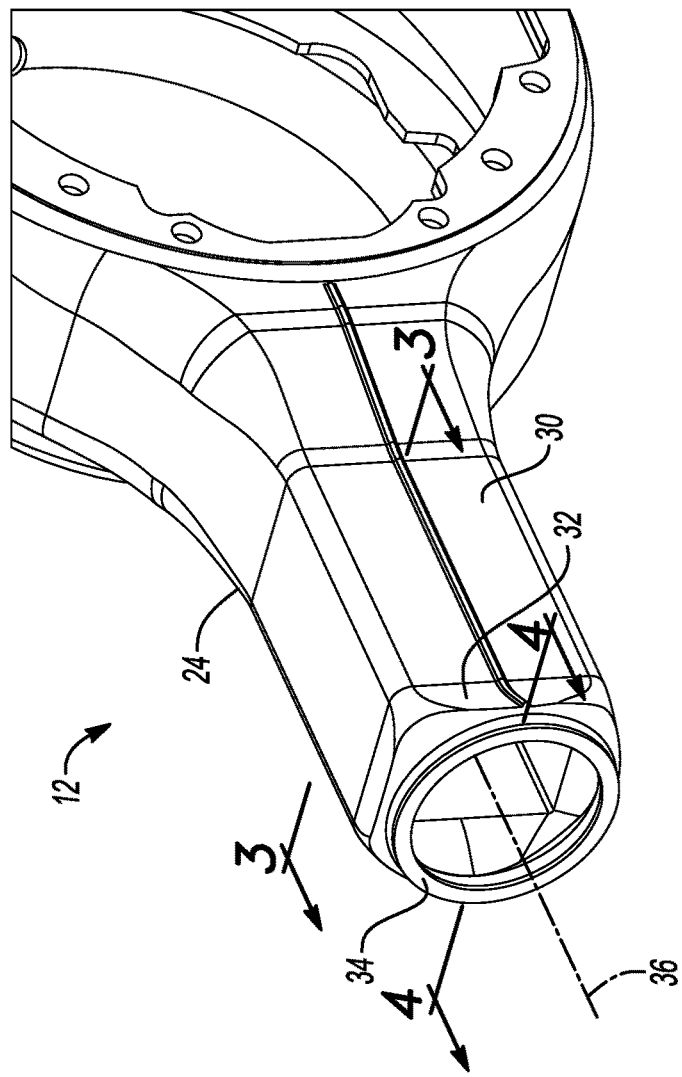
Fig-1
Fig-2

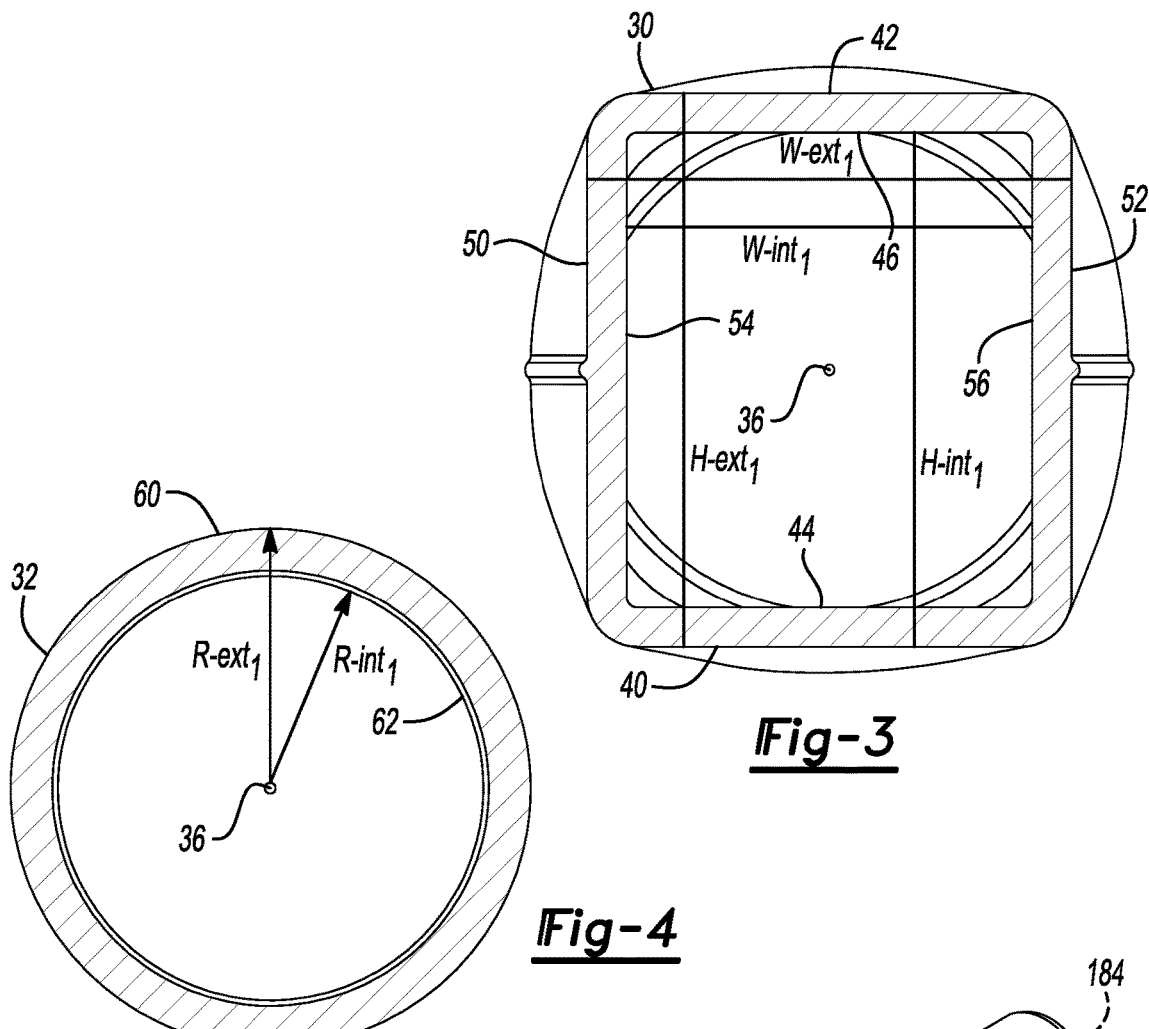
Fig-3
Fig-4
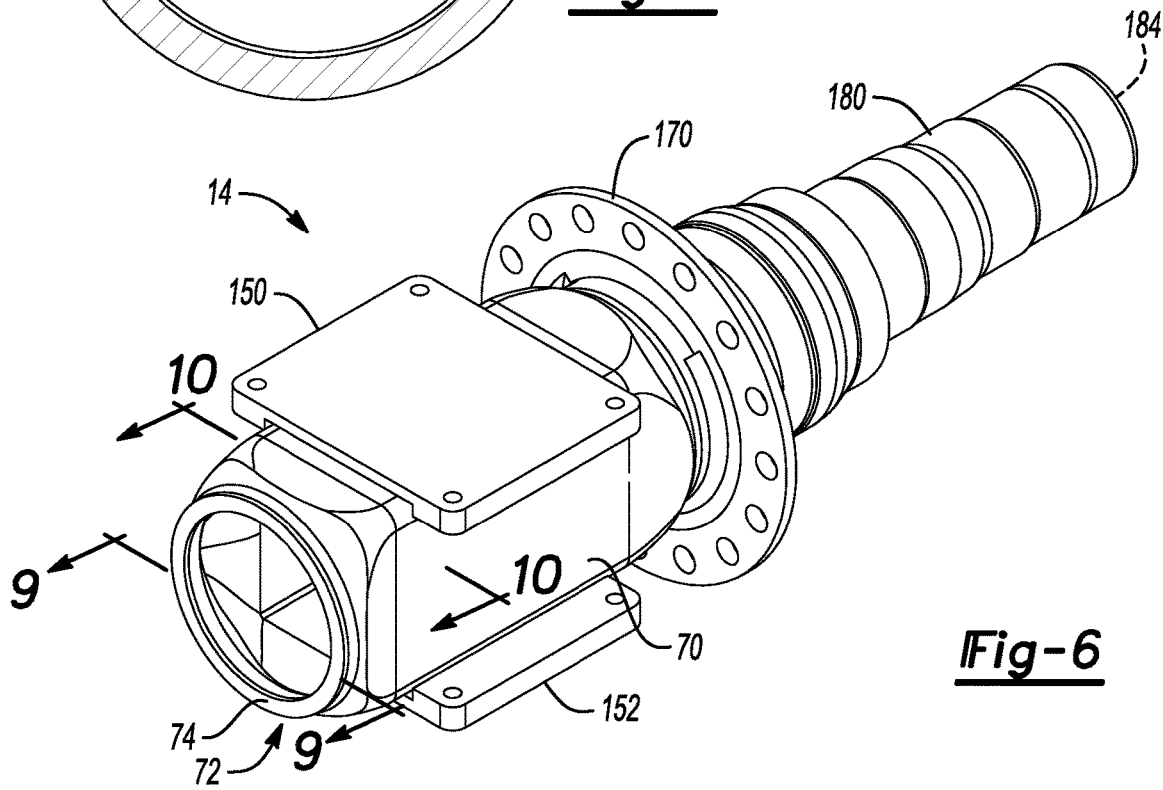
Fig-6

AXLE ASSEMBLY INCLUDING A WHEEL END AND METHOD OF MANUFACTURE

BACKGROUND

An axle assembly is disclosed in U.S. Pat. No. 9,267,596.

TECHNICAL FIELD

This disclosure relates to an axle assembly and more particularly to an axle assembly having an axle housing and a wheel end.

SUMMARY

In at least one approach, a method of manufacturing an axle housing assembly is provided. The method may include providing an axle housing having a center portion and first and second arm portions extending in opposing directions from the center portion. The first arm portion may include an end surface that faces away from the center portion. The method may further include providing a wheel end housing that includes a wheel end body, a spindle, and a mounting flange. The wheel end body may have an inboard end surface and an outboard end surface disposed opposite the inboard end surface. The spindle may have a first spindle end surface and a second spindle end surface disposed opposite the first spindle end surface. The spindle may be mounted to the wheel end body by engaging the first spindle end surface to the outboard end surface and welding the spindle to the wheel end body. The mounting flange may be welded to the wheel end body and may be spaced apart from the spindle. The method may include mounting the wheel end housing to the axle housing by engaging the inboard end surface to the end surface and welding the wheel end housing to the axle housing. The mounting flange is axially positioned closer to the axle housing than the spindle.

In at least one approach, a method of manufacturing an axle housing assembly is provided. The method may include providing an axle housing having a center portion and first and second arm portions extending in opposing directions from the center portion. The first arm portion may include an end surface that faces away from the center portion. The method may further include providing a wheel end housing that includes a wheel end body having an inboard end surface, an outboard end surface disposed opposite the inboard end surface, a center body portion that is axially positioned between and is spaced apart from the inboard end surface and the outboard end surface, a first connecting portion that extends from the inboard end surface to the center body portion, and a second connecting portion that is disposed opposite the first connecting portion and that extends from the outboard end surface to the center body portion. The inboard end surface may be shaped as a ring having an outer circumferential surface. The center body portion may have a first cross-sectional shape that differs from the shape of the inboard end surface. The wheel end housing may further include a spindle having a first spindle end surface and a second spindle end surface disposed opposite the first spindle end surface. The spindle may be mounted to the wheel end body by engaging the first spindle end surface to the outboard end surface and welding the spindle to the wheel end body. The method may further include mounting the wheel end housing to the axle housing by engaging the inboard end surface to the end surface and welding the wheel end housing to the axle housing.

In at least one approach, an axle housing assembly is provided. The axle housing assembly may include an axle housing that includes a center portion and a first arm portion that extends from the center portion. The first arm portion may include an elongated portion that extends from the center portion and a transition portion that extends in an axial direction from the elongated portion. The elongated portion and the transition portion may cooperate to define a passage that has a noncircular cross section in the elongated portion and a circular cross section at an end of the transition portion. The axle housing assembly may further include a wheel end housing that includes a wheel end body that extends from the first arm portion. The wheel end body may include a first connecting portion that extends from the transition portion, a second connecting portion that is spaced apart from the first connecting portion, a center body portion that extends from the first connecting portion to the second connecting portion, and a spindle that extends from the second connecting portion and is disposed on an opposite side of the second connecting portion from the center body portion. The first connecting portion, the center body portion, and the second connecting portion may cooperate to define a wheel end housing passage that has a noncircular cross section in the center body portion and a circular cross section at an end of the first connecting portion.

BRIEF DESCRIPTION OF THE DRAWINGS

FIG. 1 is an exploded front elevation view of an axle assembly including an axle housing and a wheel end.

FIG. 2 is a perspective view of a portion of the axle housing.

FIG. 3 is a cross-sectional view taken along line 3-3 of FIG. 2.

FIG. 4 is a cross-sectional view taken along, line 4-4 of FIG. 2.

FIG. 6 is a rear perspective view of the wheel end including a wheel end body.

DETAILED DESCRIPTION

Figure 5:
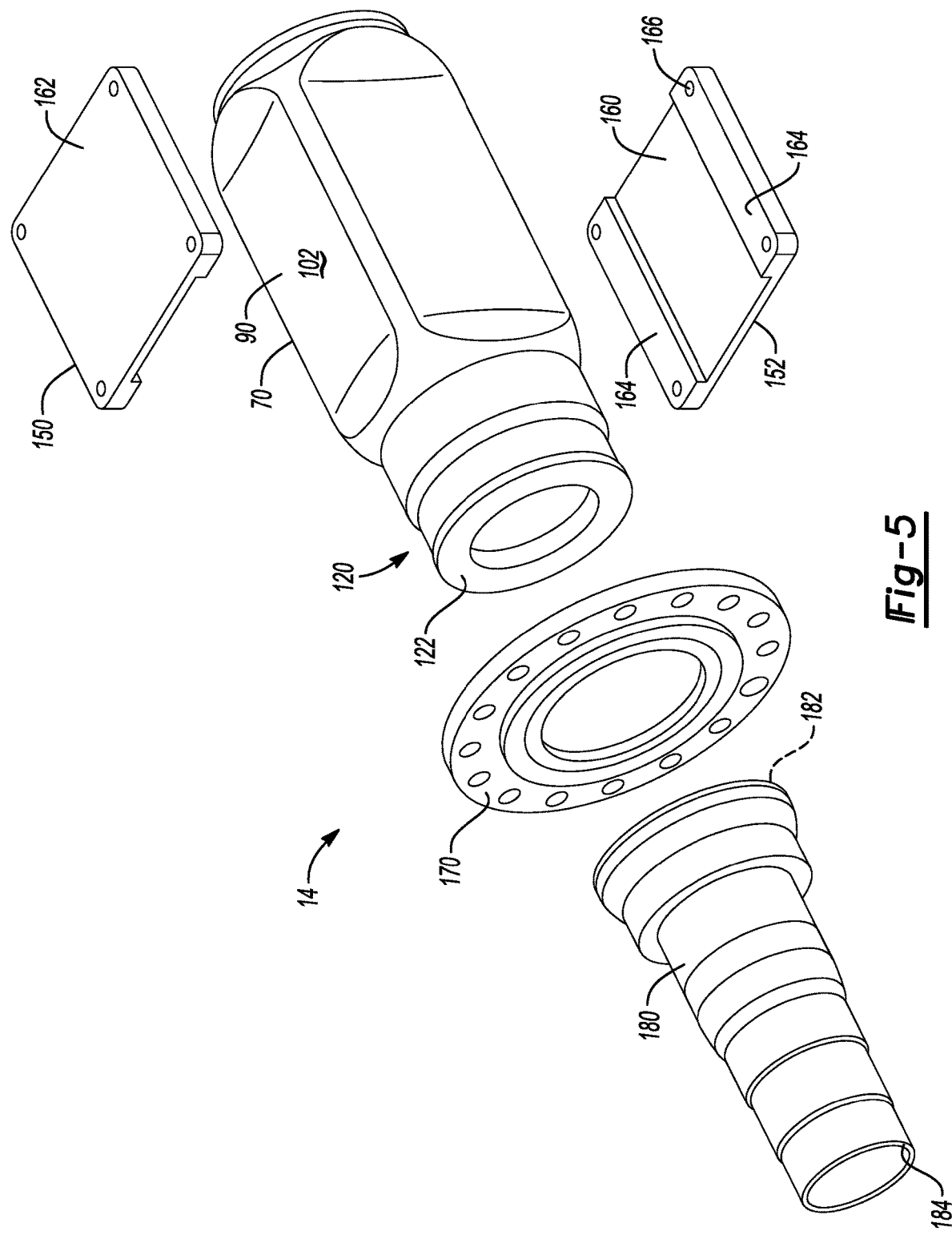
FIG. 5 is an exploded front perspective view of a wheel end.
Figure 7:
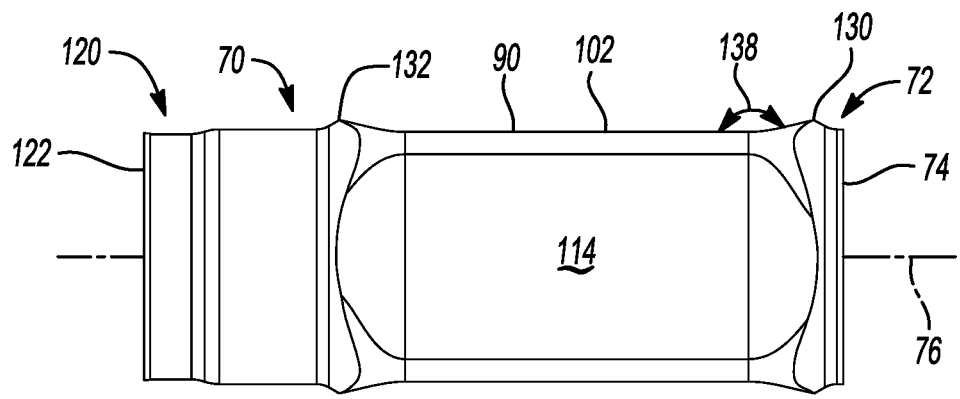
FIG. 7 is a side elevation view of the wheel end body of FIG. 5.
Figure 8:
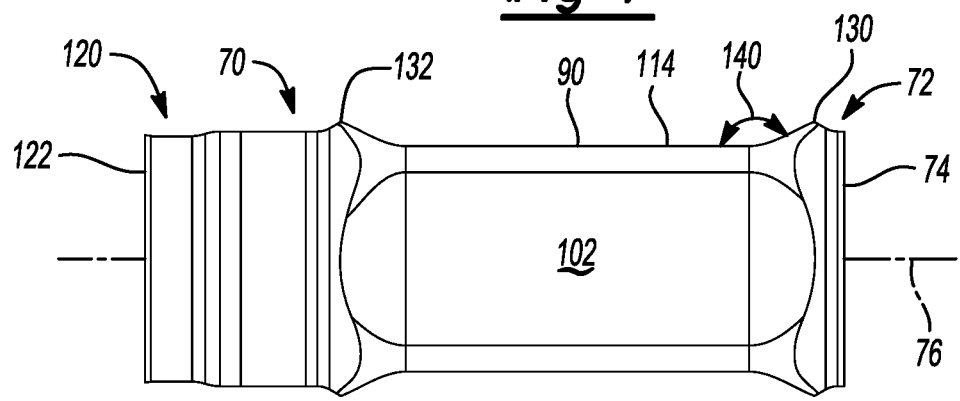
FIG. 8 is a top plan view of the wheel end body of FIG. 5.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIGS. 1 and 2, an axle housing assembly 10 may include an axle housing 12 and one or more wheel end housings 14. The axle housing 12 may include a center portion 22, a first arm portion 24, and a second arm portion 26. The first and second arm portions 24, 26 may extend in opposing directions from the center portion 22. One or both of the arm portions 24, 26, or portions thereof, may be integrally formed with the center portion 22. Alternatively, an arm portion 24, 26 may be separate from the center portion 22. In such a configuration, each arm portion 24, 26 may be attached to the center portion 22 in any suitable manner, such as by welding or with one or more fasteners. In at least one approach, the first arm portion 24 may extend to a greater distance from the center portion 22 than the second arm portion 26. In still another approach, the arm portions 24, 26 may have substantially similar configurations.

In at least one approach, the arm portions 24, 26 may each have a hollow configuration such that the arm portions 24, 26 define an arm passage or cavity that may receive a corresponding axle shaft. The arm portions 24, 26 may help separate or isolate an internally-disposed axle shaft from the surrounding environment. In at least another approach, the arm portions 24, 26 may not be hollow.

The fast arm portion 24 may have an elongated portion 30 and a transition portion 32. The transition portion 32 may include an end surface 34 at an end of the first arm portion 24 opposite the center portion 22. The end surface 34 may face away from the center portion 22. The end surface 34 may be shaped as a ring having an inside circumference and an outside circumference. In this way, the end surface 34 may be a substantially circular end surface. The elongated portion 30 and the transition portion 32 may be disposed about a central axis 36. The transition portion 32 may extend in an axial direction (e.g., along central axis 36) from the elongated portion 30 to the end surface 34.

Referring to FIG. 3, at least a portion of the elongated portion 30 may define a noncircular cross-section about the central axis 36. The cross-section may be, for example, generally polygonal (e.g., a quadrilateral that may be parallelogram-shaped such as substantially rectangular, substantially square, etc.) and may define rounded interior and/or exterior corners.

The cross-section of the elongated portion 30 may define an exterior height $H\text{-}ext_1$ that may extend between exterior surfaces of the elongated portion 30 in a first direction (e.g., from a bottom surface 40 to a top surface 42 of the elongated portion 30). The cross-section may define an interior height $H\text{-}int_1$ that may extend in the first direction between interior surfaces of the elongated portion 30 (e.g., from a lower interior surface 44 to an upper interior surface 46 of the elongated portion 30). As used herein, relative terms such as "top," "bottom," "lower," "upper," and "side" refer to the relative orientations as shown in the figures.

The cross-section of the elongated portion 30 may also define an exterior width $W\text{-}ext_1$ that may extend between exterior surfaces of the elongated portion 30 in a second direction that may be orthogonal to the first direction (e.g., from a first exterior side 50 surface to a second exterior side surface 52 of the elongated portion 30). The cross-section may define an interior width $W\text{-}int_1$ that may extend in the second direction between interior surfaces of the elongated portion 30 (e.g., from a first side interior surface 54 to a second side interior surface 56 of the elongated portion 30).

In at least one approach, the value of $H\text{-}ext_1$ may be greater than the value of $W\text{-}ext_1$. The value of $H\text{-}int_1$ may be greater than the value of $W\text{-}int_1$. In this way, the elongated portion 30 may have a rectangular cross-section disposed about the central axis 36.

Referring to FIG. 4, the transition portion 32 may define a circular cross-section about the central axis 36. The cross-section of the transition portion 32 may define an exterior radius $R\text{-}ext_1$ that may extend between exterior surfaces 60 of the transition portion 32. The cross-section may also define an interior radius $R\text{-}int_1$ that may extend between interior surfaces 62 of the transition portion 32.

Referring again to FIG. 1, the axle housing assembly 10 may include wheel end housings 14 disposed at distal ends of one or both of the first and second arm portions 24, 26 of the axle housing 12.

Referring to FIGS. 5-8, a wheel end housing 14, may include a wheel end body 70. In at least one approach, the wheel end body 70 includes a first connecting portion 72. The first connecting portion 72 may include an inboard end surface 74 at an inboard end of the wheel end body 70. The inboard end surface 74 may be shaped as a ring and may have an outer circumferential surface. The first connecting portion 72 and the inboard end surface 74 may be disposed about a central axis 76. When the axle housing assembly 10 is in the assembled configuration, the central axis 76 of the wheel end housing 14 may be coaxial with the central axis 36 of the axle housing 12.

Figure 9:
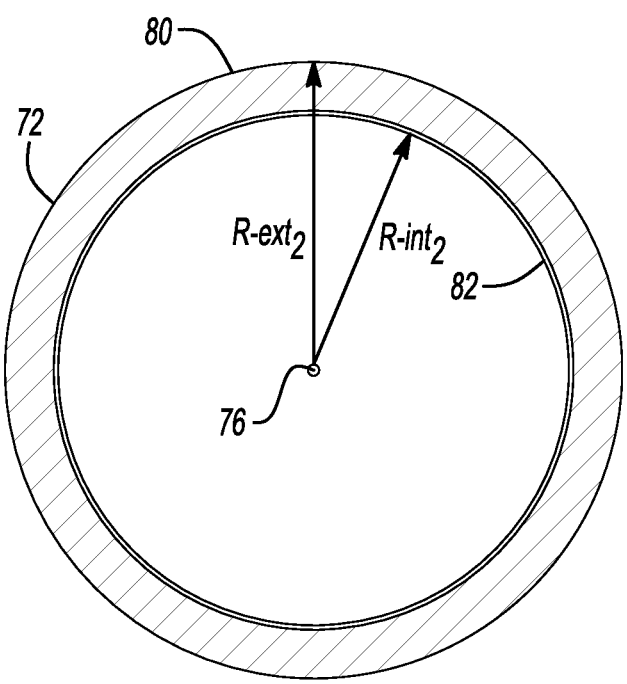
FIG. 9 is a cross-sectional view taken along line 9-9 of FIG. 6.
Figure 10:
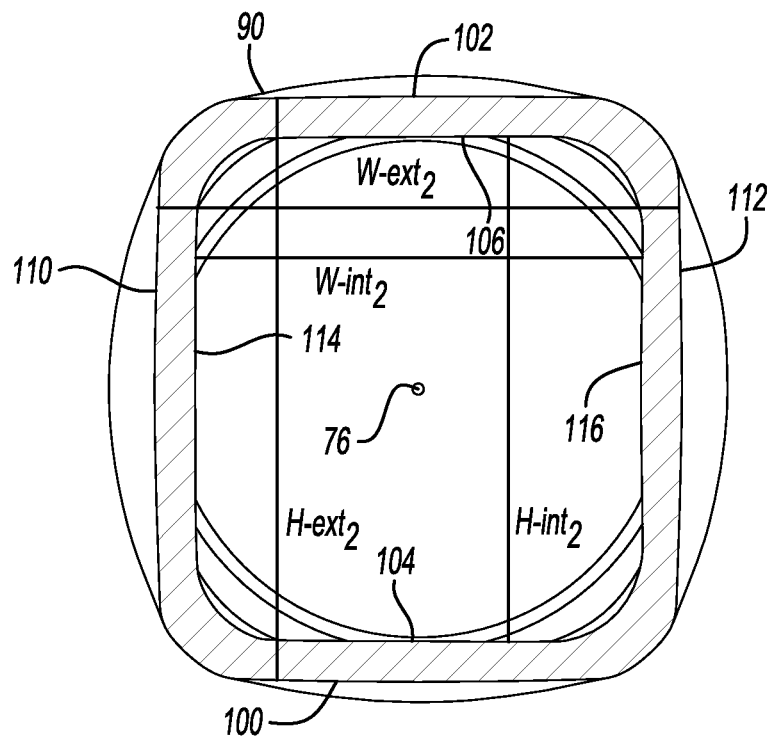
FIG. 10 is a cross-sectional view taken along line 10-10 of FIG. 6.

Referring momentarily to FIG. 9, the first connecting portion 72 may define a circular cross-section about the central axis 76. The cross-section of the first connecting portion 72 may define an exterior radius $R\text{-}ext_2$ that may extend between exterior surfaces 80 of the first connecting portion 72. The cross-section may also define an interior radius $R\text{-}int_2$ that may extend between interior surfaces 82 of the first connecting portion 72.

Figure 11:
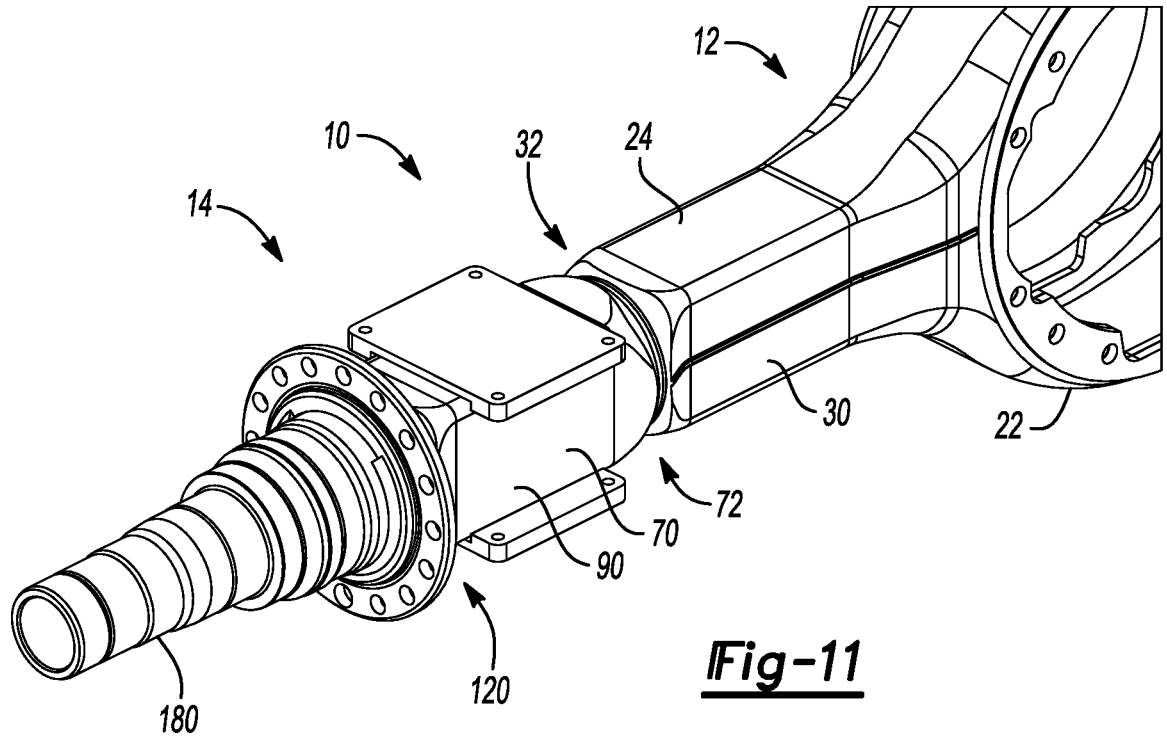
FIG. 11 is a front perspective view of an axle assembly including a wheel end secured to an axle housing.

The wheel end body 70 may also include a center body portion 90. The center body portion 90 may have a cross-sectional shape, referred to herein as a first cross-sectional shape. The first cross-sectional shape may differ from the shape of the inboard end surface 74. Referring momentarily to FIG. 11, the center body portion 90 may define a polygonal cross-section about the central axis 76 of the wheel end housing 14 (e.g., a quadrilateral that may be parallelogram-shaped such as substantially rectangular, substantially square, etc) and may define rounded interior and/or exterior corners.

The cross-section of the center body portion 90 may define an exterior height $H\text{-}ext_2$ that may extend between exterior surfaces of the center body portion 90 in a first direction (e.g., from a bottom surface 100 to a top surface 102 of the center body portion 90). The cross-section may define an interior height $H\text{-}int_2$ that may extend in the first direction between interior surfaces of the center body portion 90 (e.g., from a lower interior surface 104 to an upper interior surface 106 of the center body portion 90).

The cross-section of the center body portion 90 may also define an exterior width $W\text{-}ext_2$ that may extend between exterior surfaces of the center body portion 90 in a second direction that may be orthogonal to the first direction (e.g., from a first exterior side surface 110 to a second exterior side surface 112 of the center body portion 90). The cross-section may define an interior width $W\text{-}int_1$ that may extend in the second direction between interior surfaces of the center body portion 90 (e.g., from a first side interior surface 114 to a second side interior surface 116 of the center body portion 90).

One or more of the bottom surface 100, the top surface 102, the lower interior surface 104, the upper interior surface 106, the first exterior side surface 110, and the second exterior side surface 112 may be, or may include, planar surfaces.

In at least one approach, the value of H-ext$_2$ may be greater than the value of W-ext$_2$. Furthermore, the value of H-int$_2$ may be greater than the value of W-int$_2$. In this way, the center body portion 90 may have a rectangular cross-section disposed about the central axis 76.

In at least one approach, the interior height H-int$_2$ of the center body portion 90 may correspond (e.g., be equal) to the interior height H-int$_1$ of the elongated portion 30 of the first arm portion 24 of the axle housing 12. Furthermore, the interior width W-int$_2$ of the center body portion 90 may correspond (e.g., be equal) to the interior width W-int$_1$ of the elongated portion 30.

Similarly, in at least one approach, the exterior height H-ext$_2$ of the center body, portion 90 may correspond (e.g., be equal) to the exterior height H-ext$_1$ of the elongated portion 30 of the first arm portion 24 of the axle housing 12. Furthermore, the exterior width W-ext$_2$ of the center body portion 90 may correspond (e.g., be equal) to the exterior width W-ext$_1$ of the elongated portion 30.

The wheel end body 70 may also include a second connecting pot ion 120 that may extend away from the center body portion 90.

The second connecting portion 120 may include an outboard end surface 122 that may be disposed at an outboard end of the wheel end body 70 opposite the inboard end surface 74. In this way, the second connecting portion 120 may extend from the center body portion 90 to the outboard end surface 122. Furthermore, the center body portion 90 may be axially positioned between and spaced apart from the inboard end surface 74 and the outboard end surface 122.

The shape of the outboard end surface 122 may diner from the shape of the first cross-sectional shape of the center body portion 90. For example, the outboard end surface 122 may be shaped as a ring having an outside circumferential surface. The outboard end surface 122 may extend about the central axis 76. Furthermore, the outboard end surface may have an inner diameter that is less than an inner diameter of the inboard end surface.

In this way, the wheel end body 70 may define a wheel end passage that is substantially rectangular in the center body portion 90 and is substantially circular at the inboard end surface 74, the outboard end surface 122, or both the inboard end surface 74 and the outboard end surface 122.

Referring again to FIGS. 7 and 8, the wheel end body 70 may also include one or more shoulder portions. For example, a first shoulder portion 130 may be disposed between the center body portion 90 and the inboard end surface 74, and a second shoulder portion 132 may be disposed between the center body portion 90 and the second connecting portion 120. One or both of the first and second shoulder portions 130, 132 may extend about the central axis 76 (e.g., entirely about the central axis 76).

The first shoulder portion 130 may include a first shoulder surface that may extend from the center body portion 90 to a first shoulder ridge. The first shoulder surface may extend from the top surface 102 of the center body portion 90 at a first oblique angle, as indicated at 138 in FIG. 8. The first shoulder surface may also extend from a side surface (e.g., side surface 112 or 114) of the center body portion 90 at a second oblique angle, as indicated at 140 in FIG. 9. In at least one approach, the second oblique angle 140 may be different than the first oblique angle 138. For example, the first oblique angle 138 may be in the range of approximately 200 degrees to approximately 225 degrees, and the second oblique angle 140 may be in the range of approximately 190 degrees to approximately 195 degrees.

A second shoulder surface of the second shoulder portion 132 may similarly extend from the top and side surfaces of the center body portion 90.

Referring again to FIGS. 5 and 6, the wheel end housing 14 may include a first suspension interface plate 150, and may further include a second suspension interface plate 152. In at least one approach, the first and second suspension interface plates 150, 152 may be formed of the same shape. A suspension interface may include an engagement surface 160, an opposing surface 162, and one or more (e.g., two) flanges 164 that may be disposed on opposite sides of the suspension interface. The flanges 164 may extend from the engagement surface 160, and may define apertures 166. The apertures 166 may be through-holes that may extend through an entire thickness of the flanges 164 (e.g., from one surfaces of the flanges to the opposing surface of the flanges). In still another approach, the apertures 166 may extend through less than an entire thickness of the flanges 164.

The engagement surface 160 may be a planar surface. The opposing surface 162 may also be a planar surface, and may extend parallel to the engagement surface 160. In this way, the opposing surface 162 may receive one or more suspension components (or other suitable components) that may be secured to one or both of the suspension interfaces at the apertures 166.

In at least one approach, the suspension interface plates 150, 152 may be secured to the wheel end body 70. In one example, the suspension interface plates 150, 152 may be forged with the wheel end body 70. In another example, the suspension interface plates 150, 152 may be welded to the wheel end body 70. In still another example, the suspension interface plates 150, 152 may be mechanically fastened to the wheel end body 70.

The first suspension interface plate 150 may be secured to the wheel end body 70, for example, at the top surface 102 of the wheel end body 70, and the second suspension interface plate 152 may be welded to the wheel end body 70 at the bottom surface 100 of the wheel end body 70. In the assembled configuration shown in FIG. 6, the engagement surfaces 160 may engage the wheel end body 70 and may be disposed opposite the wheel end housing passage. The opposing surfaces 162 may face away from the wheel end body 70, and the flanges 164 may overhang from the wheel end body 70. The first and second suspension interface plates 150, 152 may be axially positioned between first connecting portion 72 and the second connecting portion 120.

The wheel end housing 14 may further include a mounting flange 170. The mounting flange 170 may receive (e.g., be disposed about) the second connecting portion 120 of the wheel end body 70. The mounting flange 170 may be secured to the second connecting portion 120. In one example, the mounting flange 170 may be forged with the second connecting portion 120. In another example, the mounting flange 170 may be welded to the second connecting portion 120. In still another example, the mounting flange 170 may be mechanically fastened to the second connecting portion 120.

The mounting flange 170 may extend away from the central axis 76. The mounting flange 170 may facilitate mounting of other components to the wheel end body 70. For example, a portion of the brake subsystem and a wheel may be mounted to the mounting flange 170. The mounting flange 170 may include a plurality of mounting stud holes that may be arranged around the central axis 76. Each mounting stud hole may receive a corresponding fastener, such as a mounting stud.

The wheel end housing 14 may further include a spindle 180. The spindle 180 may have a first spindle end surface 182 and a second spindle end surface 184 disposed opposite the first spindle end surface 182.

The spindle 180 may be secured to the wheel end body 70 such that the first spindle end surface engages (e.g., contacts) the outboard end surface 122. In one example, the spindle 180 may be forged with the wheel end body 70. In another example, the spindle 180 may be welded (e.g., friction welded) to the wheel end body 70.

A method of manufacturing an axle housing assembly may include assembling one or more components of the wheel end housing such as securing a spindle to a wheel end body, securing one or more, suspension interface plates to the wheel end body, securing a mounting flange to the wheel end body, securing a torque plate to the wheel end body, securing a disk brake to the wheel end body, securing an S-cam brake to the wheel end body, or securing another suitable component to the wheel end body.

A unitary wheel end may be cast or formed as a one-piece component. The unitary wheel end may be substantially free of welds between the various features. A reduction in the number of welds may reduce associated manufacturing time and/or costs. A reduction in the number of welds may also improve durability and reliability of the unitary wheel end.

Although discussed herein as an assembly, the wheel end may be a unitary (e.g., cast) wheel end that may include a wheel end body such as a body portion, first and second suspension interface portions, a mounting flange portion, and a spindle portion. The body portion may define a second annular mating surface. The first suspension interface portion may be disposed at a top side of the body portion, and the second suspension interface portion may be disposed at a bottom side of the body portion opposite the top side. The mounting flange portion may be disposed opposite the first and second suspension interface portions from the second annular mating surface. The spindle portion may be disposed opposite the mounting flange portion from the first and second suspension interface portions. The body portion may generally correspond to the wheel end body 70 of FIGS. 5-8; the first and second suspension interface portions may generally correspond to first and second suspension interface plates; the mounting flange portion may generally correspond to mounting flange 170; and the spindle portion may generally correspond to spindle 180.

The method may further include mounting the wheel end housing to the axle housing by engaging the inboard end surface to the end surface and welding the wheel end housing to the axle housing. In at least one approach, the spindle may be welded to the wheel end body before the wheel end housing is welded to the axle housing.

Mounting of one or more components contemplated herein may include welding the components. Welding may include mechanical welding (e.g., friction welding such as spin welding, linear friction welding, friction surfacing, etc.), electrical welding (e.g. induction welding), chemical welding, etc.

During some friction welding processes, a first part and a second part may be engaged to generate heat through mechanical friction between the first part and the second part. For example, an end surface of the first part may be placed in engagement with an end surface of the second part, thereby generating frictional heat. Frictional heating may be supplemented by non-frictional heating. For example, the first part and/or second part may be heated with induction heating, resistance heating, or an external heat source.

During friction welding, a lateral force or axial load may be imparted on the first part and/or the second part to plastically displace and fuse the first part and the second part together. The lateral force or axial load may force the first part toward the second part or vice versa. The lateral Three or axial load may generate one or more curls on the first part and the second part. In still another approach, curls may not be generated.

The axle housing assembly 10 may include one or more of the components discussed herein, and may be formed by one or more of the steps discussed herein. For example, the axle housing assembly 10 may include an axle housing 12 that includes a center portion 22 and a first arm portion 24 that extends from the center portion 22. The first arm portion 24 may including an elongated portion 30 that may extend from the center portion 22, and a transition portion 32 that extends in an axial direction from the elongated portion 30. The elongated portion 30 and the transition portion 32 may cooperate to define a passage that has a noncircular cross section in the elongated portion 30 and a circular cross section at an end of the transition portion 32. The axle housing assembly 10 may include a wheel end housing 14 that includes a wheel end body 70 that extends from the first arm portion 24. The wheel end body 70 may include a first connecting portion 72 that extends from the transition portion 32, a second connecting portion 120 that is spaced apart from the first connecting portion 72, and a center body portion 90 that extends from the first connecting portion 72 to the second connecting portion 120. The wheel end body 70 may further include a spindle 180 that extends from the second connecting portion 120 and may disposed on an opposite side of the second connecting portion 120 from the center body portion 90. The first connecting portion 72, the center body portion 90, and the second connecting portion 120 may cooperate to define a wheel end housing passage that has a noncircular cross section in the center body portion 90 and a circular cross section at an end of the first connecting portion 72. The axle housing assembly 10 may further include a mounting flange 170 that receives the second connecting portion 120 and is fixedly disposed on the second connecting portion 120. The mounting flange 170 may be axially positioned closer to the axle housing 12 than the spindle 180. Furthermore, the mounting flange 170 may be axially positioned closer to the axle housing 12 than an outboard end surface of the wheel end body.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method of manufacturing an axle housing assembly comprising:
   providing an axle housing having a center portion and first and second arm portions extending in opposing directions from the center portion, the first arm portion including an end surface that faces away from the center portion;
   providing a wheel end housing that includes:
      a wheel end body having an inboard end surface and an outboard end surface disposed opposite the inboard end surface;
      a spindle having a first spindle end surface and a second spindle end surface disposed opposite the first spindle end surface, wherein the spindle is mounted to the wheel end body by engaging the first spindle end surface to the outboard end surface and welding the spindle to the wheel end body; and
      a mounting flange that is welded to the wheel end body and is spaced apart from the spindle; and
   mounting the wheel end housing to the axle housing by engaging the inboard end surface to the end surface and welding the wheel end housing to the axle housing, wherein the mounting flange is axially positioned closer to the axle housing than the spindle, the spindle is welded to the wheel end body before the wheel end body is welded to the axle housing, the spindle is attached to the wheel end body only by welding, and the wheel end body is attached to the axle housing only by welding.

2. The method of claim 1 wherein the mounting flange is axially positioned closer to the axle housing than the outboard end surface.

3. The method of claim 1 wherein providing the wheel end housing further comprises mounting a suspension interface plate to the wheel end body between the inboard end surface and the outboard end surface.

4. A method of manufacturing an axle housing assembly comprising:
   providing an axle housing having a center portion and first and second arm portions that are disposed about a central axis and that extend in opposing directions from the center portion, the first arm portion including an end surface that faces away from the center portion;
   providing a wheel end housing that includes:
      a wheel end body having:
         an inboard end surface that is shaped as a ring having an outer circumferential surface;
         an outboard end surface disposed opposite the inboard end surface;
         a center body portion that is axially positioned between and is spaced apart from the inboard end surface and the outboard end surface, wherein the center body portion has a first cross-sectional shape, and the inboard end surface and the outboard end surface have a second cross-sectional shape that differs from the first cross-sectional shape;
         a first connecting portion that extends from the inboard end surface to the center body portion; and
         a second connecting portion that is disposed opposite the first connecting portion and that extends from the outboard end surface to the center body portion; and
      a spindle having a first spindle end surface and a second spindle end surface disposed opposite the first spindle end surface, wherein the spindle is mounted to the wheel end body by engaging the first spindle end surface to the outboard end surface and welding the spindle to the wheel end body; and
   mounting the wheel end housing to the axle housing by engaging the inboard end surface to the end surface and welding the wheel end housing to the axle housing.

5. The method of claim 4 wherein the first cross-sectional shape is substantially rectangular and the second cross-sectional shape is substantially circular.

6. The method of claim 4 wherein the inboard end surface is welded to the end surface of the first arm portion, the spindle is welded to the outboard end surface, and the spindle is not received inside the wheel end housing.

7. The method of claim 4 wherein the wheel end body has a first shoulder portion that extends from the center body portion at an oblique angle to a first shoulder ridge that is disposed further from the central axis than the center body portion and the first shoulder portion is axially positioned between the inboard end surface and the center body portion.

8. The method of claim 7 wherein the wheel end body has a second shoulder portion that extends from the center body portion at an oblique angle to a second shoulder ridge that is disposed further from the central axis than the center body portion and the second shoulder portion is axially positioned between the second connecting portion and the center body portion.

9. A method of manufacturing an axle housing assembly comprising:
   providing an axle housing having a center portion and first and second arm portions extending in opposing directions from the center portion, the first arm portion including an end surface that faces away from the center portion;
   providing a wheel end housing that includes:
      a wheel end body having: an inboard end surface that is shaped as a ring having an outer circumferential surface;
         an outboard end surface disposed opposite the inboard end surface;
         a center body portion that is axially positioned between and is spaced apart from the inboard end surface and the outboard end surface, the center body portion having a first cross-sectional shape that differs from the shape of the inboard end surface;
         a first connecting portion that extends from the inboard end surface to the center body portion; and
         a second connecting portion that is disposed opposite the first connecting portion and that extends from the outboard end surface to the center body portion; and
      a spindle having a first spindle end surface and a second spindle end surface disposed opposite the first spindle end surface, wherein the spindle is mounted to the wheel end body by engaging the first spindle end surface to the outboard end surface and welding the spindle to the wheel end body; and mounting the wheel end housing to the axle housing by engaging the inboard end surface to the end surface and welding the wheel end housing to the axle housing, wherein the spindle is welded to the wheel end body before the wheel end housing is welded to the axle housing.

10. The method of claim 9 wherein the outboard end surface is shaped as a ring having an outside circumferential surface, wherein the first cross-sectional shape differs from a cross-sectional shape of the outboard end surface.

11. The method of claim 9 wherein the wheel end body defines a wheel end passage that is substantially rectangular in the center body portion and is substantially circular at the inboard end surface.

12. The method of claim 11 wherein the wheel end body is substantially circular at the outboard end surface.

13. The method of claim 9 wherein the end surface of the first arm portion is shaped as a ring having an inside circumference and an outside circumference.

14. The method of claim 13 wherein the first arm portion further comprises an elongated portion that extends from the center portion to a transition portion, the transition portion extends in an axial direction from the elongated portion to the end surface, and the elongated portion has a noncircular cross section.

15. The method of claim 14 wherein the first arm portion defines a passage that is substantially rectangular in the elongated portion and is substantially circular at the end surface.

16. The method of claim 9 wherein the first cross-sectional shape is noncircular.

17. The method of claim 16 wherein the first cross-sectional shape is substantially rectangular.

18. The method of claim 16 wherein the first cross-sectional shape extends from the first connecting portion to the second connecting portion.

19. The method of claim 18 wherein the wheel end housing further comprises first and second suspension interface plates that are welded to the wheel end body and are axially positioned between the first connecting portion and the second connecting portion.

* * * * *